Figure 1:
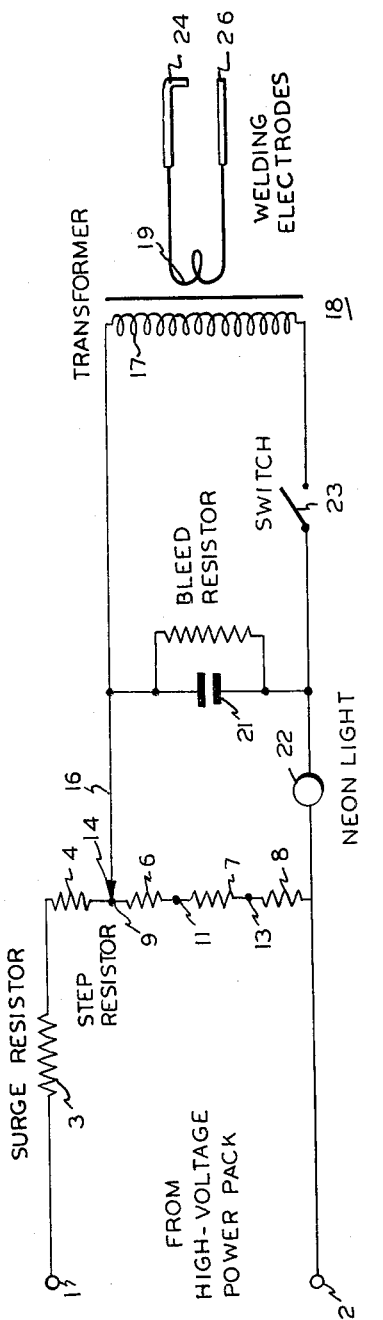

Oct. 12, 1965    M. N. FISCHER    3,211,885
SPOT WELDER
Filed June 28, 1962

INVENTOR
MARTIN N. FISCHER

BY *Fidelman & Wolfe*
ATTORNEY

United States Patent Office 3,211,885
Patented Oct. 12, 1965

3,211,885
SPOT WELDER
Martin N. Fischer, 2605 Gaither St.,
Hillcrest Heights, Md.
Filed June 28, 1962, Ser. No. 206,026
14 Claims. (Cl. 219—113)

The present invention relates to welding apparatus and more particularly to an electric welder capable of welding a wide variety of materials having a great diversity of sizes. This application is a continuation-in-part of my copending patent application Serial No. 126,438 filed July 13, 1961, for Portable Spot welding Tool, now Patent No. 3,050,618, issued August 21, 1962.

The aforesaid copending application describes an electronic welding apparatus capable of welding various size wires fabricated from various materials; particularly, wire leads on electronic components or wires employed as the interconnections between various electronic components. The welding system described in the said copending patent application is a capacitive discharge welder wherein a capacitor is charged to a predetermined voltage and then discharged through the primary winding of a transformer having the welding electrodes connected to its secondary winding. The voltage to which the capacitor is charged may be varied and is normally selected in accordance with the size of the wire and/or the material to be welded.

The commercial applicability of a portable welding tool which is to be employed to weld electronic components is the ease with which the tool may be employed. Various types of wire and the wire leads of electronic components are employed in electronic systems as are various sizes of wire. If it is necessary to employ a different voltage setting for each wire size for each specific material from which the wire is fabricated, then the operator must carry a calibration chart for each set of factors as set forth. Such a procedure is troublesome and calculated to produce poor or destructive welds. The desirable mode of operation is to permit the operator to employ a voltage setting determined by only a single variable parameter.

In accordance with the present invention, there is provided an electrical welding system employing a capacitor discharge circuit in which the voltage to which the capacitor is charged is a function of the size or gauge of the material or wire to be welded. This permits any experienced technician to employ the apparatus with the greatest of ease since any trained technician can readily gauge wire size by eye and then make the appropriate setting.

The object of the present invention as set forth above is achieved by employing a specific transformer in the specific circuit disclosed in the aforesaid copending patent application. More particularly, the welding transformer is designed to deliver a substantially constant current over a relatively wide range of load impedance. The constant current effect is obtained by winding a transformer with the primary and secondary windings in substantially diametrically opposed positions on a cylindrical core or on opposed legs of a square or rectangular core as the case may be. The amount of core material is chosen such that, if the welding load becomes too great, the core saturates and the degree of coupling between the primary and the secondary windings decreases to that provided by leakage flux. In practice, the material employed has a curved premeability curve so that the degree of saturation of the core and therefore the degree of coupling between the windings is a function of the load current. In consequence, as the load current tends to increase, the saturation of the core increases, the degree of coupling between the primary and the secondary windings decreases and the current tends to stabilize. As an example, if No. 20 copper wires are to be welded, the constant current transformer provides roughly the same current through the secondary winding as when No. 20 Nichrome wires are to be welded. As is well known the Nichrome wire has a far higher resistance than copper and yet by employing the specified transformer, the welding current generated in the secondary circuit is maintained relatively constant.

The welding transformer does not deliver completely constant current in that there are variations in the secondary current when the variations of loads become too great. Therefore, it is necessary to vary the voltage applied to the welding capacitor in accordance with wire size since it has been found that it is not possible with a practical welding transformer to accept all wire sizes of all different types of material. However, so long as adjustment is made in accordance with wire size, the transformer is capable of maintaining a relatively constant current regardless of the type of wire employed.

It is therefore an object of the present invention to provide an electrical welding system employing a transformer that delivers substantially constant currents in conjunction with a capacitor discharge welding system.

It is another object of the present invention to employ a transformer that delivers substantially constant current in an electric welding system so that a single voltage setting may be employed to weld materials having widely different resistivities.

It is still another object of the present invention to provide a capacitor discharge welder employing a transformer that delivers substantially constant current so that wires of the same size but of different materials may be welded by charging a capacitor to a specific voltage and that different size wires regardless of material are welded by adjusting the voltage to which the capacitor is charged in accordance with wire size only.

Figure 2:
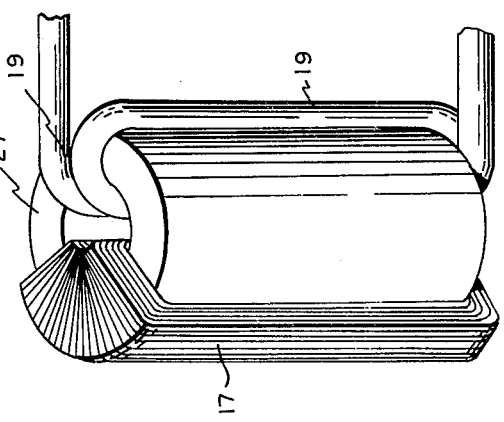

The above and still further objects, features and advantages of the present invention will become apparent upon consideration of the following detailed description of one specific embodiment thereof, especially when taken in conjunction with the accompanying drawings, wherein:

FIGURE 1 of the accompanying drawings is a schematic electrical diagram of a form of the welder of the present invention; and FIGURE 2 is a three-dimensional perspective view of a welding transformer which may be employed in conjunction with the apparatus of the present invention.

Referring now specifically to FIGURE 1 of the accompanying drawings, high voltage from a power pack is coupled across a pair of leads 1 and 2 in the welding circuit. The power pack may contain batteries or a combination of batteries and an A.C. rectifier supply if portability is desired. If portability is not necessary, a rectifier supply may be employed.

Connected in series between the leads 1 and 2 are a plurality of resistors 3, 4, 6, 7 and 8. The resistor 3 serves as a surge resistor to prevent excessive surges of current from being supplied to the circuit and the resistors 4, 6, 7 and 8 serve as a voltage divider. A series of switch terminals 9, 11 and 13 are connected between the resistors 4 and 6, 6 and 7, and 7 and 8, respectively, and are adapted to be engaged by a movable contact 14. The resistors 4, 6, 7 and 8 provide predetermined voltages at the terminals 9, 11 and 13 so that the voltage to be employed in a welding operation may be selected by the operator. The movable contact 14 is connected to a lead 16, in turn connected to the upper end of a primary winding 17 of a welding transformer 18 having a secondary winding 19. Connected in series between the lead 16 and the lead 2 is a welding capacitor 21 and neon bulb 22 is connected via a switch 23 to the lower end of the primary winding 17 of the transformer 18. Welding electrodes 24 and 26 are connected in the two ends of the secondary winding 19. It should be noted that the elements 3, 4, 6–9, 11–14 may be completely eliminated if a variable, regulated power supply is employed.

In operation, when the switch 23 is open, the capacitor 21 charges to a voltage as determined by the position of the movable contact 14 relative to the contacts 9, 11 and 13. The charge time for the capacitor is chosen to be roughly three to four seconds although the time is not critical. To effect a welding operation, the switch 23 is closed and the capacitor 21 discharges through the primary winding 17 of the transformer 18. The voltage generated in the secondary winding 19 of the welding transformer causes a current to flow through a circuit including the secondary winding, the welding electrodes 24 and 26, and the welding load. The operation of the circuit of FIGURE 1 has been described briefly above but is described in greater detail in the aforesaid copending application.

The novelty of the apparatus of the present invention resides in the utilization with the circuit as illustrated in FIGURE 1 of a transformer fabricated as indicated in FIGURE 2. The transformer in one practical embodiment thereof constitutes a hollow cylindrical laminated core 27 having a primary winding 17 and a diametrically opposed secondary winding 19. The winding 17 constitutes a large plurality of relatively fine wires which for purposes of illustration may constitute a No. 20 wire. The secondary winding 19 comprises a single turn of large cross-section wire which, for instance, may have a cross section of one-quarter to one-half of an inch. The outside diameter of the core 27 is approximately one and one-half inches and its inside diameter is roughly three-quarters of an inch. The core is three to four inches long and the radial thickness of the core and of the winding 17 is such that the primary winding 17 and secondary winding 19 almost touch internally of the core 27. The transformer step-down ratio is determined by the range of loads to be encountered and the specific uses to which the apparatus is to be applied. Thus, ratios of between 100 to 1 and 2000 to 1 may be employed. The value of the capacitor 21 depends upon the step-down ratio of the transformer 18 and its inductance; for a transformer with a 600 to 1 step-down ratio and an inductance of 150 millihenries, a 30-microfarad capacitor is employed. More particularly, the product of capacitance times inductance of the transformer may cover the range from about $1 \times 10^{-6}$ to about $100 \times 10^{-6}$. The voltage delivered by the power pack is again determined by the maximum load for which the apparatus is designed and may range from about 50 to 3000 volts. Adjustment of the voltage of a particular device is effected by means of the adjustable contact 14. A welder which has a maximum voltage of 400 volts, a 10-microfarad capacitor and a 400 to 1 step-down ratio transformer is capable of welding, as a maximum, a No. 20 wire whereas a machine providing 3000 volts, a 150-microfarad capacitor and a 2000 to 1 step-down ratio is capable of welding, as a maximum, a No. 12 wire.

The important feature of the present invention is in the design of the welding transformer which permits adjustment of the movable contact 14 in accordance with wire size only while disregarding the resistivity of the material being welded. This ability to adjust the welding voltage as a function of only wire size results from the fact that the design of the transformer illustrated in FIGURE 2 provides a substantially constant current varying loads. In consequence, if the resistance of the welding load is low, the core 27 saturates and reduces the coupling between the primary winding and secondary windings 17 and 29, respectively. On the other hand, if the current load is relatively small, the core does not saturate and maximum coupling is maintained between the primary and secondary windings. When the core 27 saturates, the transformer appears to the primary circuit as an air core transformer whereas when the secondary current is lower, the transformer appears to the primary circuit as an iron core transformer. Thus, the current in the secondary winding is maintained constant and the variation in coupling between the primary and secondary winding produces a variation in voltage such that the secondary current is maintained at a relatively fixed value. Thus, regardless of the resistance of the load within the range of the apparatus, the current therethrough is maintained constant and a single setting of the movable contact 14 can produce proper welding of wires of the same size regardless of the material to be welded.

The welding apparatus of the present invention has many of the characteristics of the welder disclosed in the aforesaid copending application in that it is portable and employs a welding gun as illustrated in said application and weighing only two or three pounds with the entire device weighing approximately fifteen pounds.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A capacitive discharge system for welding wires of different resistivities comprising a capacitor, means for charging said capacitor to a predetermined voltage, a welding transformer comprising a saturable core, a primary winding and a secondary winding, means for at will discharging said capacitor across said primary winding and means connecting a pair of welding electrodes across said secondary winding, said transformer having a saturation characteristic such that substantially the same amount of current is supplied to wires of substantially the same diameter, but of different resistivity, when the capacitor is charged to said predetermined voltage, such characteristic existing for welding currents into and below saturation of said core, said core being driven into saturation for wires having a low resistivity.

2. A system for welding wires having the same diameter but different resistivities comprising a capacitor, a transformer having a saturable core, a primary winding, a secondary winding, means for coupling the wires to be welded across the secondary winding, means for charging said capacitor to a predetermined voltage, means for discharging the capacitor through the primary winding of said transformer, said last named means including a normally open switch in series circuit with said primary winding and said capacitor, said transformer having a saturation characteristic such that substantially the same amount of current is supplied to wires of the same diameter but of different resistivity when the capacitor is charged to said predetermined voltage, such characteristic existing for welding currents into and below saturation of said core, said core being driven into saturation for low impedance wires and being unsaturated when welding large impedance wires.

3. The combination according to claim 2 wherein the step-down ratio of said transformer is in the range between 50 to 1 and 2000 to 1.

4. The system of claim 2 further including means for at will varying said predetermined voltage between 50 and 3,000 volts.

5. An apparatus for welding metal bodies of different resistivities and of substantially the same cross-sectional area comprising a constant-current transformer having a primary winding and a secondary winding, means for connecting a welding load across said secondary winding, means including a capacitor connected across said primary winding for developing a surge of current through said primary winding, said transformer having a core with a saturation characteristic such that substantially the same amount of current is supplied to bodies of the same cross-sectional area, but of differing resistivities, when the initial voltage of said surge across said primary winding is a predetermined value, the saturation characteristic existing for welding currents into saturation of said core, said core being driven into saturation when welding bodies of low resistivity.

6. The combination according to claim 5 wherein said transformer further comprises a laminated iron core, and wherein said primary and secondary windings are spaced from one another about said core.

7. The combination according to claim 5 wherein said core comprises a hollow cylinder, both of said windings extending longitudinally on different segments of said core.

8. A method for welding wires having differing diameters and resistivities comprising the steps of charging a capacitor to a predetermined voltage, said voltage being the same for wires of the same diameter and being irrespective of the wire resistivity, said voltage being higher for larger diameter wires, discharging said capacitor through the primary winding of a transformer with a saturable core and a secondary winding, and coupling energy from said secondary winding to the wires being welded, said transformer core being saturated or unsaturated during capacitor discharge when low or high resistance wires are respectively coupled to said secondary winding for welding.

9. A method for welding wires having the same diameter and differing resistivities comprising the steps of charging a capacitor to a fixed, predetermined voltage, discharging said capacitor through the primary winding of a transformer having a saturable core and a secondary winding, and coupling energy from said secondary winding to the wires being welded, said transformer core being saturated or unsaturated during capacitor discharge when low or high resistance wires are respectively coupled to said secondary winding as the welding load.

10. A method for welding bodies having differing cross-sectional areas and resistivity comprising the steps of charging a capacitor to a predetermined voltage, said voltage being fixed for wires of the same cross-sectional area of the body being welded and being irrespective of the body resistivity, said voltage being higher for larger cross-sectional bodies, discharging said capacitor through the primary winding of a transformer having a saturable core and a secondary winding, and coupling energy from said secondary winding to the body being welded, said transformer core being saturated or unsaturated during capacitor discharge when low or high resistivity bodies are respectively coupled to said secondary winding.

11. A method for welding bodies having fixed, predetermined cross-sectional area but of differing resistivities comprising the steps of charging a capacitor to a predetermined, fixed voltage, discharging said capacitor through the primary winding of a transformer having a saturable core and a secondary winding, and coupling energy from said secondary winding to the body being welded, said transformer core being saturated or unsaturated during capacitor discharge when low or high resistivity bodies are respectively coupled to said secondary winding.

12. A method capable of welding either copper or Nichrome wires of the same diameter comprising the steps of charging a capacitor to the same, predetermined voltage for both types of wires, discharging the capacitor through the primary winding of a transformer having a saturable core and a secondary winding, coupling energy induced in the secondary winding to the wires being welded, said core being saturated or unsaturated during capacitor discharge when copper or Nichrome wires are respectively being welded.

13. A method for welding either copper or Nichrome wires of the same or differing diameters comprising the steps of charging a capacitor to the same predetermined voltage for both types of wires having the same diameter, said voltage being higher for large diameter wires, discharging the capacitor through the primary winding of a transformer having a saturable core and a secondary winding, coupling energy induced in the secondary winding to the wires being welded, said core being saturated or unsaturated during capacitor discharge when copper or Nichrome wires are respectively being welded.

14. A system for welding bodies having substantially the same cross-sectional area but different resistivities comprising a capacitor, a transformer having a saturable core, a primary winding and a secondary winding, means for coupling the bodies to be welded across the secondary winding, means for charging said capacitor to a predetermined voltage, means for discharging the capacitor through the primary winding of said transformer, said last named means including a normally open switch in series circuit with said primary winding and said capacitor, said transformer having a saturation characteristic such that substantially the same amount of current is supplied to bodies of substantially the same cross-sectional area but of different resistivity when the capacitor is charged to said predetermined voltage, such characteristic existing for welding currents into saturation of said core, said core being driven into saturation when bodies of low resistivity are welded.

References Cited by the Examiner

UNITED STATES PATENTS

| | | | |
|---|---|---|---|
| 1,108,050 | 8/14 | Williams | 219—108 X |
| 1,252,144 | 1/18 | Murray | 219—108 |
| 1,836,615 | 12/31 | Owen | 336—155 |
| 2,184,628 | 12/39 | Watson et al. | 219—113 |
| 2,651,701 | 9/53 | Backen | 219—90 |
| 2,708,219 | 5/55 | Carver | 336—155 X |
| 2,760,041 | 8/56 | Yonkers | 219—90 |

RICHARD M. WOOD, *Primary Examiner.*

MAX L. LEVY, *Examiner.*